(12) United States Patent
Morimura et al.

(10) Patent No.: US 7,840,517 B2
(45) Date of Patent: Nov. 23, 2010

(54) PERFORMANCE EVALUATING APPARATUS, METHOD, AND COMPUTER-READABLE MEDIUM

(75) Inventors: Tomohiro Morimura, Yokohama (JP); Yoshimasa Masuoka, Kunitachi (JP)

(73) Assignee: Hitachi, Ltd., Tokyo (JP)

( * ) Notice: Subject to any disclaimer, the term of this patent is extended or adjusted under 35 U.S.C. 154(b) by 701 days.

(21) Appl. No.: 11/697,231

(22) Filed: Apr. 5, 2007

(65) Prior Publication Data

US 2008/0154837 A1    Jun. 26, 2008

(30) Foreign Application Priority Data

Dec. 21, 2006    (JP)    ............................. 2006-344253

(51) Int. Cl.
  *G06F 17/00* (2006.01)
  *G06N 5/02* (2006.01)
(52) U.S. Cl. ........................................................ 706/47
(58) Field of Classification Search .................... 706/47
  See application file for complete search history.

(56) References Cited

U.S. PATENT DOCUMENTS

| | | | | |
|---|---|---|---|---|
| 4,890,227 | A | * | 12/1989 | Watanabe et al. ............. 706/14 |
| 5,088,048 | A | * | 2/1992 | Dixon et al. .................... 706/51 |
| 2005/0154576 | A1 | * | 7/2005 | Tarui et al. ..................... 703/22 |
| 2005/0182747 | A1 | * | 8/2005 | Nakamoto et al. .............. 707/1 |

FOREIGN PATENT DOCUMENTS

| | | |
|---|---|---|
| JP | 2005-196601 | 7/2005 |
| JP | 2005-234861 | 9/2005 |
| JP | 2005-354280 | 12/2005 |

OTHER PUBLICATIONS

Yoshio Sato, "System Management Solution for Policy-Based Automatic Operation", Hitachi Review, vol. 87, No. 4, pp. 45-50, Apr. 2005, Partial Trans.
Kenya Nishiki et al, "IP Usage Management Architecture Using XML Technology", Technical Report of IEICE, vol. 100, No. 452, pp. 1-6, Nov. 2000, Abstract.

\* cited by examiner

*Primary Examiner*—Donald Sparks
*Assistant Examiner*—Vincent M Gonzales
(74) *Attorney, Agent, or Firm*—Miles & Stockbridge P.C.

(57) ABSTRACT

A performance evaluating apparatus for a rule is provided, which is capable of evaluating a business value of a rule applied to the operation and management of an information system through autonomous control. The performance evaluating apparatus for a rule collects, respectively before activation processing that is prescribed by a rule and after completion of the execution of the processing, a rule execution history and a system state information indicating a state of a monitored information system that is necessary for calculation of the business value. The business value is calculated from the collected system state information and rule execution history by a given calculation formula.

21 Claims, 15 Drawing Sheets

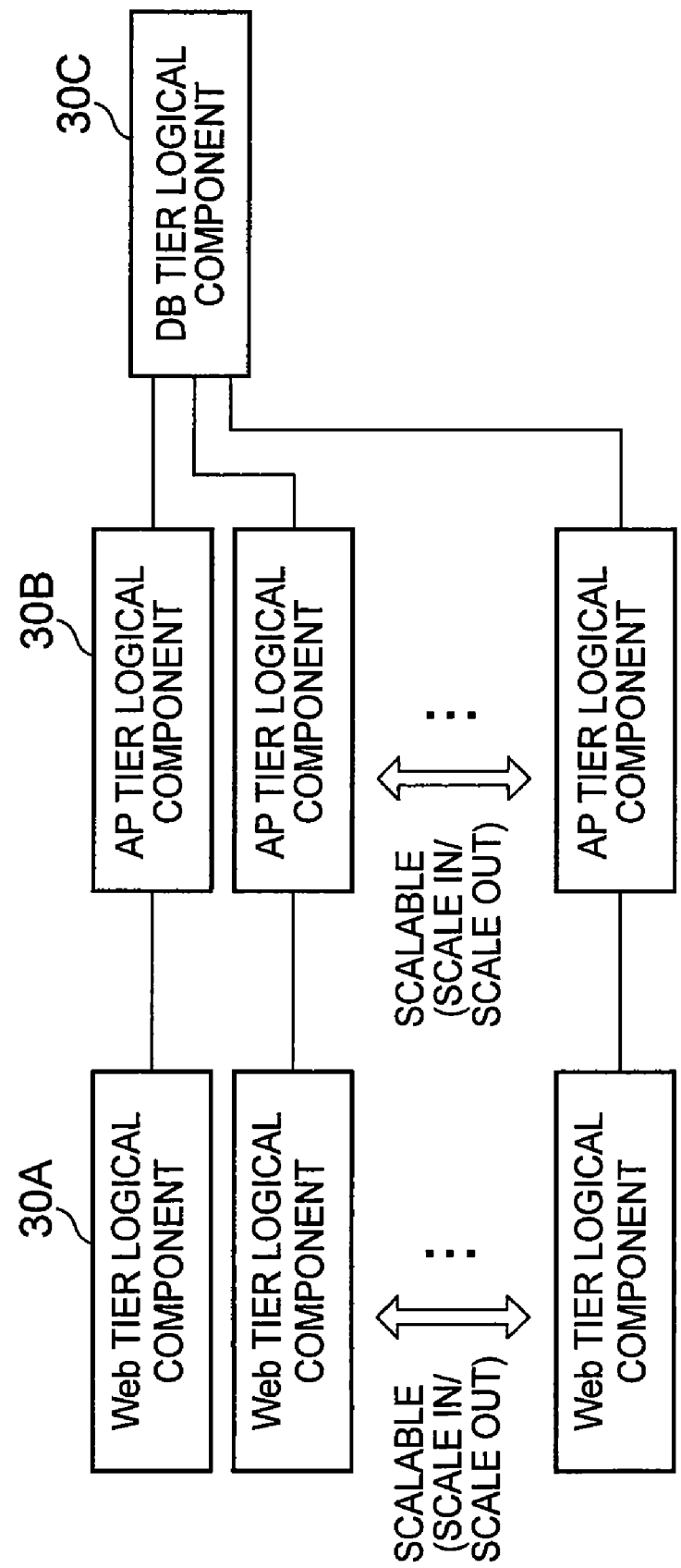

FIG. 3

240 RULE STORING UNIT

| RULE ID 2400 | TRIGGER_CONDITION 2401 | APPLY_TO 2402 | ACTION_ID 2403 |
|---|---|---|---|
| A | CPU UTILIZATION ORATE OF WebServer#1 IS 20% OR LOWER | RESOURCE:WebServer | SCALE-IN Web TIER |
| B | COUNT OF REQUESTS FOR CATALOG SERVICE IS 100 OR MORE PER SECOND | SERVICE:Caralog | SCALE-OUT Web TIER |
| C | LOAD OF Web TIER FLUCTUATES WILDLY | GROUP:WebTier | ADJUST LOAD-BALANCING COEFFICIENT OF Web TIER |
| D | SERVER FAILURE | GROUP:Server | SWITCH TO AUXILIARY SERVER |
| E | DETECTION OF DISASTER SUCH AS EARTHQUAKE, TSUNAMI, OR FIRE | APPLICATION_SYSTEM:Onlinshop | SWITCH FROM PRIMARY SYSTEM TO SECONDARY SYSTEM |
| ... | ... | ... | ... |

FIG. 6

| RESOURCE_ID | TYPE | STATE | MACHINE_TYPE | ... |
|---|---|---|---|---|
| WebServer #1 | WebServer | RUNNING | SERVER_00 | ... |
| WebServer #2 | WebServer | RUNNING | SERVER_00 | ... |
| WebServer #3 | WebServer | STANDBY | SERVER_00 | ... |
| APServer #1 | APServer | RUNNING | SERVER_00 | ... |
| APServer #2 | APServer | RUNNING | SERVER_00 | ... |
| APServer #3 | APServer | STANDBY | SERVER_00 | ... |
| DBServer #1 | DBServer | RUNNING | SERVER_01 | ... |
| ⋮ | ⋮ | ⋮ | ⋮ | ⋱ |

| RESOURCE_ID | CPU_UTIL | MEMORY_UTIL | ... |
|---|---|---|---|
| WebServer #1 | 83 | 65 | ... |
| WebServer #2 | 87 | 69 | ... |
| ⋮ | ⋮ | ⋮ | ⋱ |

| | 520 | 521 | 522 | 523 | 524 | |
|---|---|---|---|---|---|---|
| | SERVICE_ID | REQUESTS | RESPONSE_TIME | FAILS | THROUHPUT | ... |
| | CATALOG | 231 | 4.8 | 4 | 198 | ... |
| | LOGIN | 153 | 3.9 | 1 | 139 | ... |
| | CART | 53 | 2.2 | 0 | 53 | ... |
| | ORDER | 23 | 2.1 | 0 | 23 | ... |
| | ⋮ | ⋮ | ⋮ | ⋮ | ⋮ | ⋱ |

FIG. 9

| INSTANCE_ID 2600 | PERIOD 2601 | TYPE 2602 | MACHINE_TYPE 2603 | STATE 2604 | NUMBER_OF 2605 | CPU_UTIL 2606 | ... |
|---|---|---|---|---|---|---|---|
| B-00000001 | START | WebServer | SERVER_00 | RUNNING | 2 | 86 | ... |
| B-00000001 | START | WebServer | SERVER_00 | STANDBY | 1 | 0 | ... |
| B-00000001 | START | APServer | SERVER_00 | RUNNING | 2 | 32 | ... |
| B-00000001 | START | APServer | SERVER_00 | STANDBY | 1 | 0 | ... |
| B-00000001 | START | DBServer | SERVER_01 | RUNNING | 1 | 41 | ... |
| ... | ... | ... | ... | ... | ... | ... | ... |

FIG. 10

| INSTANCE_ID 2610 | PERIOD 2611 | SERVICE_ID 2612 | REQUESTS 2613 | RESPONSE_TIME 2614 | FAILS 2615 | THROUGHPUT 2616 | ... |
|---|---|---|---|---|---|---|---|
| B-00000001 | START | CATALOG | 231 | 4.8 | 4 | 198 | ... |
| B-00000001 | START | LOGIN | 153 | 3.9 | 1 | 139 | ... |
| B-00000001 | START | CART | 53 | 2.2 | 0 | 53 | ... |
| B-00000001 | START | ORDER | 23 | 2.1 | 0 | 23 | ... |
| ... | ... | ... | ... | ... | ... | ... | ... |

FIG. 11

| RULE_ID | INSTANCE_ID | START_TIME | END_TIME | EXECUTED_ACTION_ID | RESULT |
|---|---|---|---|---|---|
| B | B-00000001 | 2005-12-24-09:00:30:031 | 2005-12-24-09:08:22:152 | SCALE-OUT Web TIER | OK |
| C | C-00000001 | 2005-12-25-23:10:15:021 | 2005-12-25-23:13:53:892 | ADJUST LOAD-BALANCING COEFFICIENT OF Web TIER | OK |
| .. | .. | .. | .. | .. | .. |
| A | A-00000013 | 2006-01-02-01:23:06:180 | 2006-01-02-01:28-24:380 | SCALE-IN Web TIER | OK |
| .. | .. | .. | .. | .. | .. |
| D | D-00000001 | 2006-02-23-09:05:02:032 | 2006-02-23-09:18:31:413 | SWITCH TO AUXILIARY SERVER | OK |
| .. | .. | .. | .. | .. | .. |
| E | E-00000001 | 2006-09-01-09:00:00:000 | 2006-09-01-10:05:00:000 | SWITCH FROM PRIMARY SYSTEM TO SECONDARY SYSTEM | OK |
| .. | .. | .. | .. | .. | .. |

2620  2621  2622  2623  2624  2625

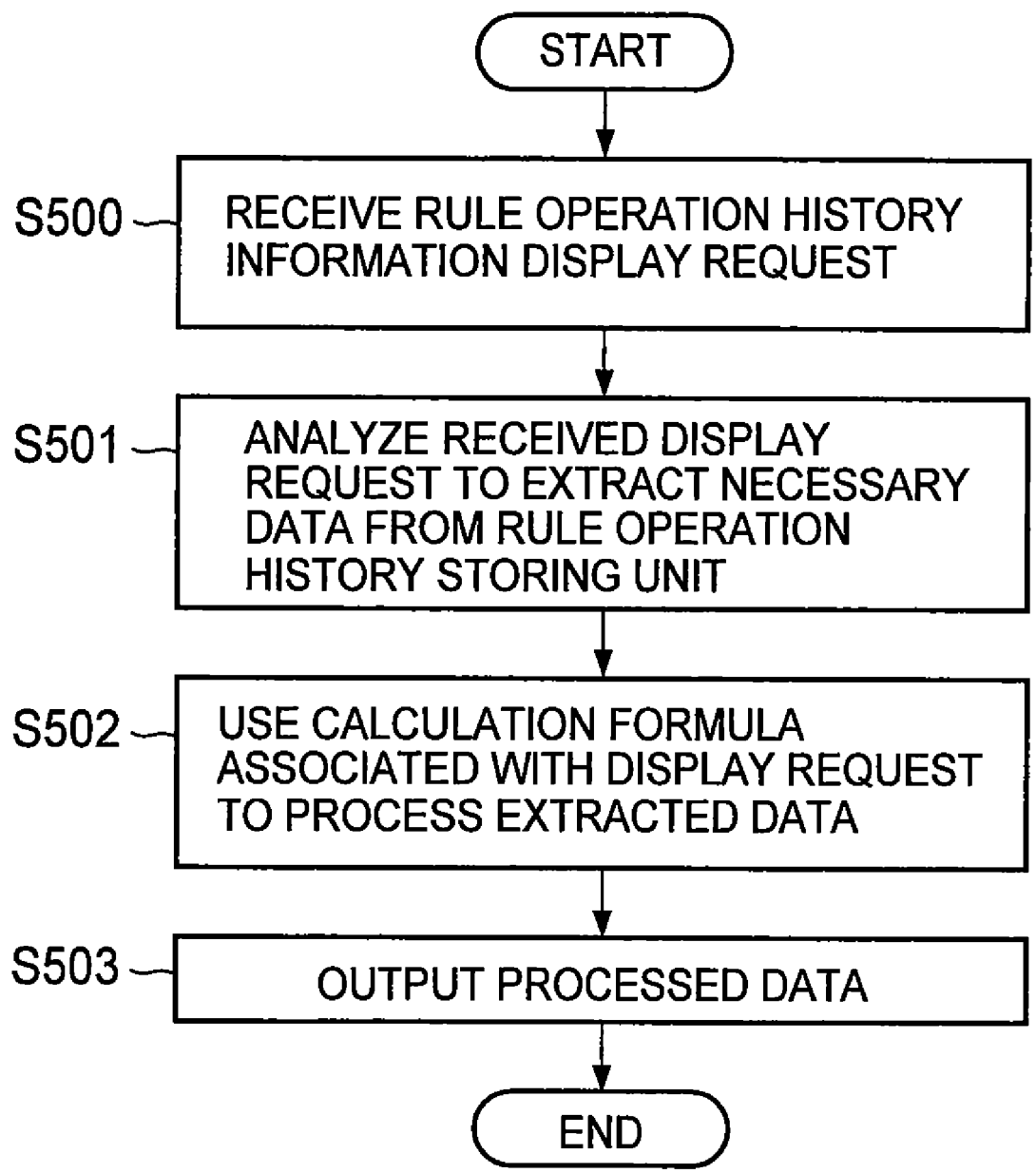

FIG. 13

| DEF_ID | DEFINITION |
|---|---|
| E1 | RESOURCE INCREASE/DECREASE COST = $\Sigma$ x((MACHINE_TYPEx RSOURCE COUNT UPON COMPLETION OF EXECUTION OF RULE − MACHINE_TYPEx RESOURCE COUNT UPON ACTIVATION OF RULE) X FINANCIAL_COST OF MACHINE_TYPEx) |
| E2 | EFFECTIVE RESOURCE UTILIZATION DEGREE = ARITHMETIC AVERAGE OF CPU_UTIL UPON COMPLETION OF EXECUTION OF RULE − ARITHMETIC AVERAGE OF CPU_UTIL UPON ACTIVATION OF RULE |
| E3 | POWER CONSUMPTION INCREASE OR DECREASE AMOUNT = INCREASE OR DECREASE IN NUMBER OF RESOURCES IN FULL_POWER STATE X FULL_POWER + INCREASE OR DECREASE IN NUMBER OF RESOURCES IN SAVED_POWER STATE X SAVED_POWER |
| E4 | SALES CONTRIBUTION DEGREE = $\Sigma$ i((SERVICE i PROCESSING COUNT UPON COMPLETION OF EXECUTION OF RULE − SERVICE i PROCESSING COUNT UPON ACTIVATION OF RULE) X SERVICE VALUE PER TRANSACTION OF SERVICE i) |
| E5 | LOST CHANCE DEGREE = $\Sigma$ j((SERVICE j FAILURE COUNT UPON COMPLETION OF EXECUTION OF RULE − SERVICE j FAILURE COUNT UPON ACTIVATION OF RULE) X LOST CHANCE WEIGHTING COEFFICIENT OF SERVICE j) |
| ... | ... |

FIG. 14

| MACHINE_TYPE | FINANCIAL_COST | FULL_POWER | SAVED_POWER | ... |
|---|---|---|---|---|
| SERVER_00 | $15 | 300W (CPU_UTIL>=50) | 200W (CPU_UTIL<50) | ... |
| SERVER_01 | $300 | 450W (CPU_UTIL>=50) | 300W (CPU_UTIL<50) | ... |
| ⋮ | ⋮ | ⋮ | ⋮ | ⋱ |

| SERVICE_ID | BUSINESS_VALUE | FAILS_LOST |
|---|---|---|
| LOGIN | 50/tran | 0.1 |
| CATALOG | 100/tran | 0.2 |
| CART | 250/tran | 0.5 |
| ORDER | 500/tran | 1.0 |
| ⋮ | ⋮ | ⋮ |

| | 560 | 561 | 562 | 563 | 564 RESOURCE UTILIZATION STATE | | | | 565 SERVICE UTILIZATION STATE | | | | 566 BUSINESS VALUE | | |
|---|---|---|---|---|---|---|---|---|---|---|---|---|---|---|---|
| | RULE ID | ACTIVATION COUNT | SUCCESS COUNT | AVERAGE EXECUTION TIME | RESOURCE INCREASE/ DECREASE IN NUMBER | AVERAGE CPU UTILIZATION RATE | INCREASE/DECREASE IN AMOUNT OF POWER CONSUMPTION | ... | AVERAGE PROCESSING RATE | PROCESSING AMOUNT | SLO ACHIEVEMENT RATE | ... | RESOURCE COST | EFFECTIVE RESOURCE UTILIZATION DEGREE | SALES CONTRIBUTION DEGREE | ... |
| | B | 23 | 19 | 138 | +25 | 65% | +6300 | ... | 92% | 23451 | 97% | ... | $153203 | -0.3 | 12,345.432 | ... |
| | C | 17 | 12 | 213 | -12 | 58% | -4300 | ... | 100% | 7932 | 100% | ... | $0 | +0.25 | 43,212.346 | ... |
| | ... | ... | ... | ... | ... | ... | ... | ... | ... | ... | ... | ... | ... | ... | ... | ... |

US 7,840,517 B2

PERFORMANCE EVALUATING APPARATUS, METHOD, AND COMPUTER-READABLE MEDIUM

FIELD OF THE INVENTION

The present invention relates to a performance evaluating apparatus for an information system composed of multiple computers and a method of evaluating the performance of the information system.

BACKGROUND OF THE INVENTION

Rule-based autonomous operation is a technology for simplifying the operation and management of an information system. Rule-based autonomous control is based on a rule dictating that processing (an action), including a preset operation and management operation, is executed when a certain condition is met. A rule used in autonomous control technology is evaluated for its effect based on information, such as a result of applying the rule, and is improved in accordance with the evaluation. This method is called feedback method and is attracting attention. For instance, Japanese Patent Laid-open Publication No. 2005-354280 (hereinafter referred to as Patent Document 1) discloses a technique related to improvement through feedback of rule application history information, which contains information about a period during which a rule called a policy rule is applied, and information indicating the result of applying the rule. According to the technique, the application history information is collected and analyzed in order to collect statistical information about a condition associated with the rule, and the statistical information is used to change condition and action constitute the rule.

SUMMARY OF THE INVENTION

Rule evaluation often employs, for example, a time point at which a rule is activated, an activation count, accumulated operating time, or an achievement rate for an objective set in advance in an information system to be controlled. The rule that makes the information system consume a large amount of computer resources and accordingly raises the cost, or that causes large power consumption by being in operation and thus puts a heavy burden on the natural environment, is not always given a high score. Therefore there is a need to evaluate a rule from more viewpoints and more pieces of information relating to an information system to be controlled, than only the rule activation time, activation count, accumulated operating time, or objective achievement rate.

For example, collecting and saving every piece of state information about an information system to be controlled makes it possible to evaluate a rule based on the saved information from various viewpoints including business viewpoint such as the rule's contribution to sales figures of a service that the information system provides, contribution to the running cost of the information system, and contribution to power consumption during running of the information system. However, there is a wide variety of information that indicates the state of an information system, and information that changes at short time intervals has to be collected at short intervals. The amount of data to be collected is therefore huge and it is impossible in practice to collect every piece of state information about an information system to be controlled.

The present invention has been made in view of the above-mentioned circumstances, and therefore an object of the present invention is to evaluate a business value of a rule for use in operation management through autonomous control based on information that is efficiently collected for evaluation from many viewpoints including a business viewpoint, and to numerically show business value from those viewpoints.

The present invention attains the above-mentioned object as follows:

Before processing, which is prescribed by a rule, is activated, system state information, which indicates the state of a system to be monitored and is necessary for business value evaluation, is collected and stored in association with information that identifies the processing to be activated, as well as information that indicates that associated information is system state information collected upon activation of the processing. After the processing prescribed by the rule is finished, system state information indicating the state of the monitored system is collected and stored in association with information that identifies the finished processing, as well as information that indicates that associated information is system state information collected upon completion of the execution of the processing. The business value of the rule is calculated from these two pieces of system state information.

For example, according to a first aspect of the present invention, there is provided a performance evaluating apparatus for a rule used in an autonomous control system that controls a system that is to be monitored by executing processing that is prescribed in a preset rule in accordance with the state of the monitored system, which is composed of multiple computer resources, the performance evaluating apparatus including: a rule executing unit which executes processing prescribed in an associated rule in accordance with the state of the monitored system and which stores a history about the executed processing as a rule execution history; a rule execution history obtaining unit which obtains a rule execution history from the rule executing unit to store the obtained history in a rule operation history storing unit; a system state information collecting unit which collects system state information indicating the state of the monitored system to send the collected system state information to the rule operation history storing unit; and an effect calculating unit which calculates a business value from the stored system state information and execution history by a calculation formula, in which: the rule executing unit has a rule processing unit, an execution history storing unit, and an execution history transmitting unit, the rule processing unit sending, in executing processing prescribed in a rule, to the system state information collecting unit, an activation notification containing a processing ID with which the processing to be executed is identified, and then starting execution of processing identified by the processing ID, and after finishing execution of the processing prescribed in the rule, sending an execution completion notification containing a processing ID of the finished processing to the system state information collecting unit, the execution history storing unit storing a rule execution history in which information about processing executed by the rule processing unit is associated with a processing ID of this processing, the execution history transmitting unit sending, upon request from the rule execution history obtaining unit, a rule execution history in the execution history storing unit to the rule execution history obtaining unit; upon reception of the activation notification from the rule executing unit, the system state information collecting unit collects system state information and sends the collected system state information to the rule execution history obtaining unit in association with a processing ID that is contained in the received activation notification and information that indicates that associated information is system state information collected upon activation of processing identified by this processing ID; upon reception of the execution completion notification from the rule executing unit, the system state information collecting unit collects system state information and sends the collected system state information to the rule execution history obtaining unit in association with a processing ID that is contained in the received execution completion notification and information that indicates that associated information is system state information collected upon completion of the execution of processing identified by this processing ID; and the effect calculating unit calculates a business value from the stored system state information and execution history by a calculation formula.

For example, according to a second aspect of the present invention, there is provided a performance evaluating method for a performance evaluating apparatus for a rule used in an autonomous control system that controls a system to be monitored by executing processing that is prescribed in a preset rule in accordance with the state of the monitored system which is composed of multiple computer resources, which includes: a rule executing unit which executes processing prescribed in an associated rule in accordance with the state of the monitored system and which stores a history about the executed processing as a rule execution history; a rule execution history obtaining unit which obtains a rule execution history from the rule executing unit to store the obtained history in a rule operation history storing unit; a system state information collecting unit which collects system state information indicating the state of the monitored system to send the collected system state information to the rule operation history storing unit; and an effect calculating unit which calculates a business value from the stored system state information and execution history by a calculation formula, the method including the steps of: causing the rule executing unit to execute a rule processing step, an execution history storing step, and an execution history transmitting step, the rule processing step including sending, in executing processing prescribed in a rule, to the system state information collecting unit, an activation notification containing a processing ID with which the processing to be executed is identified, and then, starting execution of processing identified by the processing ID, and after finishing execution of the processing prescribed in the rule, sending an execution completion notification containing a processing ID of the finished processing to the system state information collecting unit, the execution history storing step including storing in an execution history storing unit a rule execution history in which information about processing executed in the rule processing step is associated with a processing ID of this processing, the execution history transmitting step including sending, upon request from the rule execution history obtaining unit, a rule execution history in the execution history storing unit to the rule execution history obtaining unit; causing the system state information collecting unit to collect, upon reception of the activation notification from the rule executing unit, system state information and send the collected system state information to the rule execution history obtaining unit in association with a processing ID that is contained in the received activation notification and information that indicates that associated information is system state information collected upon activation of processing identified by this processing ID; and collect upon reception of the execution completion notification from the rule executing unit, system state information and send the collected system state information to the rule execution history obtaining unit in association with a processing ID that is contained in the received execution completion notification and information that indicates that associated information is system state information collected upon completion of the execution of processing identified by this processing ID; and causing the effect calculating unit to calculate a business value from the stored system state information and execution history by a calculation formula.

For example, according to a third aspect of the present invention, there is provided a program that controls a performance evaluating apparatus for a rule used in an autonomous control system that controls a system to be monitored by executing processing that is prescribed in a preset rule in accordance with a state of the monitored system which is composed of multiple computer resources, the program causing the performance evaluating apparatus for a rule to function as: a rule executing function which executes processing prescribed in an associated rule in accordance with the state of the monitored system and which stores a history about the executed processing as a rule execution history; a rule execution history obtaining function which obtains a rule execution history from the rule executing function to store the obtained history in a rule operation history storing unit; a system state information collecting function which collects system state information indicating the state of the monitored system to send the collected system state information to the rule operation history storing unit; and an effect calculating function which calculates a business value from the stored system state information and execution history by a calculation formula, and in the program: the rule executing function has a rule processing function, an execution history storing function, and an execution history transmitting function, the rule processing function sending, in executing processing prescribed in a rule, to the system state information collecting function, an activation notification containing a processing ID with which the processing to be executed is identified, and then, starting execution of processing identified by the processing ID, and after finishing execution of the processing prescribed in the rule, sending an execution completion notification containing a processing ID of the finished processing to the system state information collecting function, the execution history storing function storing in the execution history storing unit a rule execution history in which information about processing executed by the rule processing function is associated with a processing ID of this processing, the execution history transmitting function sending, upon request from the rule execution history obtaining function, a rule execution history in the execution history storing unit to the rule execution history obtaining function; upon reception of the activation notification from the rule executing function, the system state information collecting function collects system state information and stores in the rule operation history storing unit the collected system state information in association with a processing ID that is contained in the received activation notification and information that indicates that associated information is system state information collected upon activation of processing identified by this processing ID; upon reception of the execution completion notification from the rule executing function, the system state information collecting function collects system state information and stores in the rule operation history storing unit the collected system state information in association with a processing ID that is contained in the received execution completion notification and information that indicates that associated information is system state information collected upon completion of the execution of processing identified by this processing ID; and the effect calculating function calculates a business value from the stored system state information and execution history by a calculation formula.

According to a performance evaluating apparatus of the present invention, a rule applied to the operation and management of an information system can be evaluated from a business viewpoint.

BRIEF DESCRIPTION OF THE DRAWINGS

In the accompanying drawings:

FIG. 2 is a conceptual diagram illustrating a business operation system of a Web three-tier model;

FIG. 3 is a diagram showing an example of a configuration of data that is stored in a rule storing unit;

FIG. 6 is a diagram illustrating an example of a configuration of data that is obtained by a system state information collecting unit in Step S302;

FIG. 7 is a diagram illustrating an example of a configuration of data that is collected by the system state information collecting unit in Step S304;

FIG. 8 is a diagram illustrating an example of a configuration of data that is collected by the system state information collecting unit in Step S305;

FIG. 9 is a diagram illustrating an example of a data configuration of resource configuration/state information which is stored in a rule operation history storing unit;

FIG. 10 is a diagram illustrating an example of a data configuration of information that indicates a service utilization state and is stored in the rule operation history storing unit;

FIG. 11 is a diagram illustrating an example of a data configuration of an execution history which is stored in the rule operation history storing unit;

FIG. 12 is a flow chart showing an example of data processing that is executed by an effect calculating unit;

FIG. 13 is a diagram showing an example of a calculation formula that is used in the data processing;

FIG. 14 is a diagram illustrating an example of a configuration of data such as financial cost and power consumption that are defined for each resource;

FIG. 15 is a diagram illustrating an example of a configuration of data for calculating a business value;

FIG. 16 is a diagram showing an example of a configuration of information that is output from the performance evaluating apparatus for a rule;

DESCRIPTION OF THE PREFERRED EMBODIMENT

An embodiment of the present invention will be described below.

Figure 1:
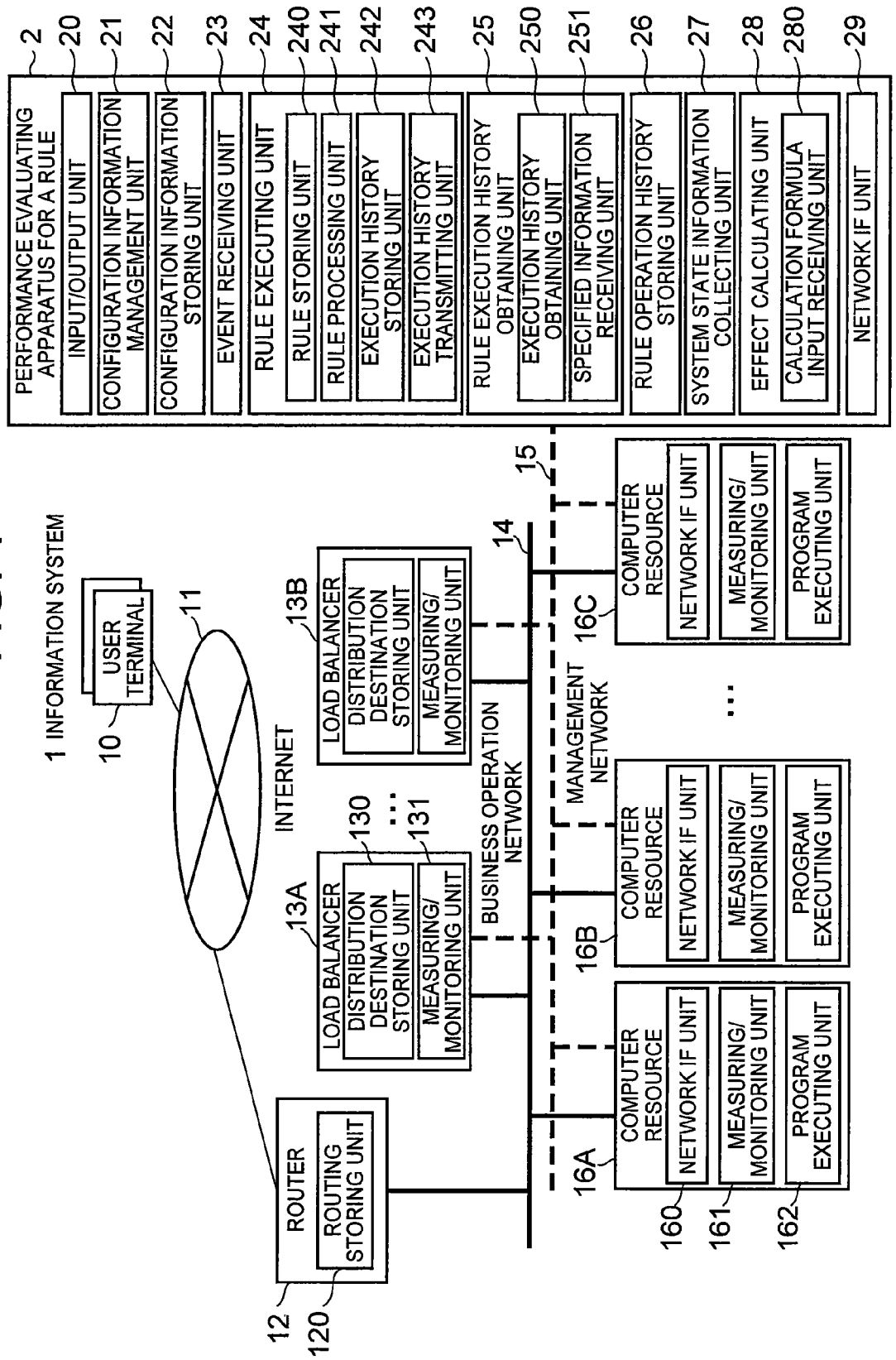
FIG. 1 is a system configuration diagram showing an example of a configuration of an information system and a performance evaluating apparatus according to an embodiment of the present invention.

FIG. 1 is a system configuration diagram showing an example of a configuration of an information system 1 and a performance evaluating apparatus 2 according to an embodiment of the present invention. As shown in the drawing, the information system 1 of this embodiment has multiple load balancers 13 and multiple computer resources 16, which constitute an information system, a router 12, which connects the information system to the Internet 11, and user terminals 10, which access the information system via the Internet 11.

The router 12, the load balancers 13, and the computer resources 16 are connected to one another via a business operation network 14 and via a management network 15. The performance evaluating apparatus for a rule 2 is connected to the management network 15.

The management network 15 is a network used by the performance evaluating apparatus for a rule 2 to manage each load balancer 13 and each computer resource 16. The business operation network 14 is a network used by each computer resource 16 to provide a service to the user terminals 10. The business operation network 14 and the management network 15 may be built separately using physically different cables or may be built on the same cable as logically different networks.

The router 12 has a routing storing unit 120 which stores for each load balancer 13 the association relation between a global IP address and a local IP address. The router 12 sends a request received from one of the user terminals 10 via the Internet 11 to the load balancer 13 whose local IP address is, according to the association relation stored in the routing storing unit 120, associated with a global IP address that is specified as the destination of this request.

The router 12 also receives from the load balancer 13 a result of processing the request, and sends the result to the user terminal 10 that is the sender of this request via the Internet 11. Other functions of the router 12 are the same as those of any existing router, and will not be described in detail. Each load balancer 13 forms a business operation system with multiple computer resources 16 via the business operation network 14.

A business operation system in this embodiment is a business operation system of a Web three-tier model as shown in FIG. 2. The business operation system of the Web three-tier model is composed of Web tier logical components 30A, which perform processing of accepting requests from users through Web browsers, application (AP) tier logical components 30B, which process services provided to users, and a database (DB) tier logical component 30C.

The Web tier logical components 30A are Web servers that are scalable (scale in/scale out, meaning that their number can be increased or reduced). The application tier logical components 30B are scalable (scale in/scale out) application servers. The database tier logical component 30C is a database server.

The computer resources 16, in which Web containers are installed, are allotted to the Web servers. The computer resources 16, in which application containers are installed, are allotted to the application servers. The computer resource 16, in which a database management system is installed, are allotted to the database servers. The Web servers and the AP servers may be allocated physically to the same servers. The configuration of the business operation system is not limited to the Web three-tier model and may be any configuration.

Each load balancer 13 has a distribution destination storing unit 130 to register information about which computer resource 16 it can be connected to, and a measuring/monitoring unit 131 which measures and monitors metrics of the load balancer 13.

Each load balancer 13 sends, via the business operation network 14, a request received from the router 12 to one of the computer resources 16 that are registered in the distribution destination storing unit 130, to have this computer resource 16 process the request. Also, each load balancer 13 receives, via the business operation network 14, from one of the computer resources 16 registered in the distribution destination storing unit 130, a result of processing a request, and sends, via the router 12, the received processing result to the sender of the request.

Each load balancer 13 executes processing such as updating the distribution destination storing unit 130 in accordance with an operation received from the performance evaluating apparatus for a rule 2 via the management network 15. The measuring/monitoring unit 131 measures and monitors information of its own load balancer 13, such as performance information including the operating state and the CPU utilization rate, and connection information including the count of requests received from the router 12, and when a condition defined in advance is met, the measuring/monitoring unit 131 notifies the performance evaluating apparatus for a rule 2 via the management network 15 of the fact as an event.

In this embodiment, the measuring/monitoring unit 131 monitors, as events, whether or not there is a change in an operating state (activation or shutdown) of its own load balancer 13, whether or not the load level has exceeded a given reference value, and the like. Other functions of the load balancers 13 are the same as those of any load balancer used in existing load-balancing systems, and will not be described in detail.

Each computer resource 16 uses an installed program to process a request received via the business operation network 14, and sends a result of processing the request to the load balancer 13 or other computer resource 16 that forms, together with this computer resource 16, a business operation system. Also, each computer resource 16 controls execution of a program in accordance with an operation received from the performance evaluating apparatus for a rule 2 via the management network 15.

As shown in FIG. 1, each computer resource 16 has a network interface (IF) unit 160 to connect with the business operation network 14 and with the management network 15, a measuring/monitoring unit 161, and a program executing unit 162.

The measuring/monitoring unit 161 measures and monitors information of its own computer resource 16, such as performance information including the operating state and the CPU utilization rate, power consumption, and connection information including the count of requests received from the router 12, and when a condition defined in advance is met, the measuring/monitoring unit 161 notifies the performance evaluating apparatus for a rule 2 via the management network 15 of the fact, as an event. In this embodiment, the measuring/monitoring unit 161 monitors as events whether or not there is a change in an operating state (activation or shutdown) of its own computer resource 16, whether or not the load level has exceeded a given reference value, and the like.

The program executing unit 162 uses a program installed in its computer resource 16 to process a request received via the business operation network 14, and sends, via the business operation network 14, a result of processing the request to the load balancer 13 or other computer resource 16 that forms a business operation system together with its own computer resource 16.

Programs installed in the computer resources 16 in this embodiment are a Web container, an application container, and a database management system. As mentioned above, the computer resource 16 in which a Web container is installed is allocated as a Web server, the computer resource 16 in which an application container is installed is allocated as an application server, and the computer resource 16 in which a database management system is installed is allocated as a database server. Other functions of the computer resources 16 are the same as those of any computer resource used in existing load-sharing systems, and will not be described in detail.

The performance evaluating apparatus 2 evaluates the performance for a rule applied to the operation and management of the information system 1. The performance evaluating apparatus for a rule 2 has an input/output unit 20, a configuration information management unit 21, a configuration information storing unit 22, an event receiving unit 23, a rule executing unit 24, a rule execution history obtaining unit 25, a specified information receiving unit 251, a rule operation history storing unit 26, a system state information collecting unit 27, an effect calculating unit 28, a calculation formula input receiving unit 280, and a network interface (IF) unit 29.

The input/output unit 20 handles inputs to and outputs from the performance evaluating apparatus for a rule 2 by, for example, accepting an operation input from a user who is operating the performance evaluating apparatus for a rule 2, or outputting information that is created by the performance evaluating apparatus for a rule 2. The network IF unit 29 has a function of enabling the performance evaluating apparatus for a rule 2 to communicate over the management network 15 with an information system to be monitored (a business operation system constituted of multiple load balancers 13 and multiple computer resources 16).

The configuration information storing unit 22 stores the system configuration information of an information system to be monitored and a business operation system hosted by this information system. The system configuration information stored in the configuration information storing unit 22 contains resource configuration information, component configuration information, and component allocation information. The resource configuration information includes information about IT resources constituting the information system (including information that indicates the operating state of the resources) and inter-resource connection information. The component configuration information concerns logical components in an application program forming the business operation system. The component allocation information concerns which logical component is allocated to which physical computer resource 16.

The configuration information management unit 21 monitors configuration information of an information system and, when the configuration information changes, changes information stored in the configuration information storing unit 22. The event receiving unit 23 receives events from the load balancers 13 or the computer resources 16, and supplies the events to the rule executing unit 24.

Events received by the event receiving unit 23 in this embodiment include changes detected by the measuring/monitoring units of the load balancers 13 or the computer resources 16, for example, changes in load such as a change in CPU utilization rate, an increase or decrease in used memory amount, an increase or decrease in count of page faults occurring upon memory access, and an increase or decrease in I/O waiting time, and changes in operating state of IT resources including programs that provide business operation services.

The rule executing unit 24 has a rule storing unit 240, a rule processing unit 241, an execution history storing unit 242, and an execution history transmitting unit 243.

The rule storing unit 240 stores, for example, as shown in FIG. 3, a rule used in the operation and management of an information system in association with a RULE_ID 2400 that identifies each rule. Each rule contains a TRIGGER_CONDITION 2401, which indicates a condition of applying processing, an ACTION_ID 2403, which indicates processing (an action) that is executed when the information system fulfills this condition, and APPLY_TO 2402, which indicates a resource that executes this processing.

In the example of FIG. 3, to a rule that has "A" as the RULE_ID 2400, an application condition "the CPU utilization rate of WebServer#1 is 20% or lower" is set as the TRIGGER_CONDITION 2401, "RESOURCE: WebServer#1" is specified as the APPLY_TO 2402, and "scale-in the Web tier" is specified as the ACTION_ID 2403. In this embodiment, the character string preceding ":" in the APPLY_TO 2402, that is, "RESOURCE", indicates that the type of IT resource to which the processing is applied is an IT resource such as a server.

Other types of IT resource to which processing is applied in this embodiment include "SERVICE", which is an identifier indicating a service that is provided by a business operation system, "GROUP", which is an identifier indicating a group of multiple IT resources, and "APPLICATION_SYSTEM", which is an identifier indicating the entire business operation system. In this embodiment, processing of "scaling-in the Webtier" means processing of reducing the count of Web servers that constitute the Web tier, to thereby free redundant IT resources.

Rules that have "B", "C", "D", and "E" as the RULE_ID 2400 will be described in a similar manner. To a rule whose RULE_ID 2400 is "B", an application condition "the count of requests for a catalog service is 100 or more per second" is set when a "catalog service", which is a service for displaying a catalog, is included in services provided by a business operation system. "SERVICE: Catalog" and "scale-out the Web tier" are specified as the APPLY_TO 2402 and as the ACTION_ID 2403, respectively, for the rule "B".

Processing of "scaling-out the Web tier" in this embodiment means processing of increasing Web servers in number to thereby lessen the load per Web server and enable the business operation system to process requests from many more users.

To a rule whose RULE_ID 2400 is "C", an application condition "the load on the Web tier fluctuates wildly" is set, "GROUP: WebTier" indicating a group of Web servers constituting the Web tier is specified as the APPLY_TO 2402, and processing "adjust the load-balancing coefficient of the Web tier" is specified as the ACTION_ID 2403.

Processing of "adjusting the load-balancing coefficient of the Web tier" in this embodiment means processing of adjusting a load-balancing coefficient, which is a settings parameter set to the load balancers 13 for load balancing in each Web server, so that the load is evened out among the multiple Web servers.

To a rule whose RULE_ID 2400 is "D", an application condition "server failure" is set, "GROUP: Server" indicating a group of IT resources whose resource type is server machine is specified as the APPLY_TO 2402, and processing "switch to an auxiliary server" is specified as the ACTION_ID 2403.

Processing of "switching to an auxiliary server" in this embodiment means processing of switching from a failed server to an auxiliary server which is on standby for the purpose of continuing the service.

To a rule whose RULE_ID 2400 is "E", an application condition "occurrence of accident such as earthquake, tsunami, and fire is detected" is set, "APPLICATION_SYSTEM: Onlineshop" indicating an entire business operation system is specified as the APPLY_TO 2402, and processing "switching systems from primary to secondary (failover)" is specified as the ACTION_ID 2403.

Processing of "switching systems from primary to secondary (failover)" in this embodiment means processing of switching from a primary site where a business operation system is run, to a secondary site which is set up in advance as a backup site when the primary site is struck by a disaster, in order to have the secondary site take over the business operation.

The rule processing unit 241 receives an event from the event receiving unit 23, and searches rules in the rule storing unit 240 for an application condition that matches the received event. The rule processing unit 241 then extracts processing that is stored in the rule storing unit 240 in association with the retrieved application condition.

The rule processing unit 241 next creates an instance as an executor of the extracted processing, and sends an activation notification containing identification information of the created instance to the system state information collecting unit 27. After that, the rule processing unit 241 makes the created instance execute the extracted processing. As the instance finishes the processing, the rule processing unit 241 sends an execution completion notification containing identification information of the instance to the rule execution history obtaining unit 25 and the system state information collecting unit 27.

When processing is executed in response to an event notified by the event receiving unit 23, the rule storing unit 240 stores, in the execution history storing unit 242, history information about the executed processing as an execution history. An execution history contains identification information of an instance that has executed the processing in question, start time of the processing, end time of the processing, information indicating the executed processing, a result of executing the processing, and the like.

Identification information of an instance is constituted of identification information of a rule containing an application condition that triggers the creation of this instance, and a sequence number which is assigned to each newly created instance such that no two instances have the same sequence number. Accordingly, from instance identification information, an instance can uniquely be identified and a rule that causes the creation of the instance can be identified as well.

The execution history transmitting unit 243 receives an execution history obtaining request containing instance identification information from the rule execution history obtaining unit 25, and refers to the operating state of the rule processing unit 241. When it is found as a result that the rule processing unit 241 is not executing processing, the execution history transmitting unit 243 extracts, from the execution history storing unit 242, an execution history that is associated with the instance identification information contained in the received execution history obtaining request, and sends the extracted execution history to the rule execution history obtaining unit 25. On the other hand, when the rule processing unit 241 is found to be executing processing, the execution history transmitting unit 243 sends a message indicating that the rule processing unit 241 is performing processing, to the rule execution history obtaining unit 25 in response to the request.

The system state information collecting unit 27 refers to configuration information stored in the configuration information storing unit 22 when receiving an activation notification from the rule processing unit 241. The system state information collecting unit 27 uses the configuration information to identify which resource is in operation, and obtains a resource utilization state and service utilization information from each resource that is in operation via the management network 15.

The system state information collecting unit 27 stores, in the rule operation history storing unit 26, the obtained resource utilization state and service utilization information in association with the instance identification information contained in the activation notification and information indicating that associated information is the state of the system before this instance starts execution of processing.

When receiving an execution completion notification from the rule processing unit 241, the system state information collecting unit 27 refers to configuration information stored in the configuration information storing unit 22. The system state information collecting unit 27 uses the configuration information to identify which resource is in operation, and obtains a resource utilization state and service utilization information from each resource that is in operation via the management network 15.

The system state information collecting unit 27 stores, in the rule operation history storing unit 26, the obtained resource utilization state and service utilization information in association with the instance identification information contained in the execution completion notification and information indicating that associated information is the state of the system after this instance completes the execution of processing.

The rule processing unit 241 and the system state information collecting unit 27, which are packaged as different processes in the performance evaluating apparatus for a rule 2, are processed in parallel in the performance evaluating apparatus for a rule 2. The rule processing unit 241 and the system state information collecting unit 27 can therefore execute their respective processing without affecting each other's processing.

The rule operation history storing unit 26 stores system state information collected by the system state information collecting unit 27 and an execution history obtained by the rule execution history obtaining unit 25.

The rule execution history obtaining unit 25 has an execution history acquisition executing unit 250 and a specified information receiving unit 251. The specified information receiving unit 251 receives, via the input/output unit 20, from a user of the performance evaluating apparatus for a rule 2, an execution history obtaining interval and an execution count indicating how many times processing contained in a rule should be executed before the execution history is obtained. The specified information receiving unit 251 sends the received obtaining interval and execution count to the execution history acquisition executing unit 250.

The execution history acquisition executing unit 250 increments the execution count of processing each time an execution completion notification of the processing is received from the rule processing unit 241. When the accumulated execution count reaches an execution count notified by the specified information receiving unit 251 or higher, the execution history acquisition executing unit 250 refers to the rule operation history storing unit 26 to identify instance identification information for which a resource utilization state and service utilization information have been stored but no execution history has been stored.

The execution history acquisition executing unit 250 sends an execution history obtaining request that contains the identified instance identification information to the execution history transmitting unit 243. Receiving the requested execution history from the execution history transmitting unit 243, the execution history acquisition executing unit 250 saves the time of reception and resets the accumulated execution count.

In cases where a time equal to or longer than an obtaining interval notified by the specified information receiving unit 251 has elapsed since the previous time an execution history was obtained, the execution history acquisition executing unit 250 refers to the rule operation history storing unit 26 to identify instance identification information for which a resource utilization state and service utilization information have been stored but no execution history has been stored.

The execution history acquisition executing unit 250 sends an execution history obtaining request that contains the identified instance identification information to the execution history transmitting unit 243. In cases in which the requested execution history is received from the execution history transmitting unit 243, the execution history acquisition executing unit 250 saves the time of reception and resets the accumulated execution count.

The effect calculating unit 28 receives a rule operation history display request from a user through the input/output unit 20, retrieves necessary operation history information from the rule operation history storing unit 26, formats the retrieved data into a necessary format with the use of a preset calculation formula, and outputs the data through the input/output unit 20. The effect calculating unit 28 may have the calculation formula input receiving unit 280 to receive, via the input/output unit 20, input of a calculation formula that is defined by a user, and employ the entered calculation formula.

The operation of the performance evaluating apparatus for a rule 2 will be described next.

Figure 4:
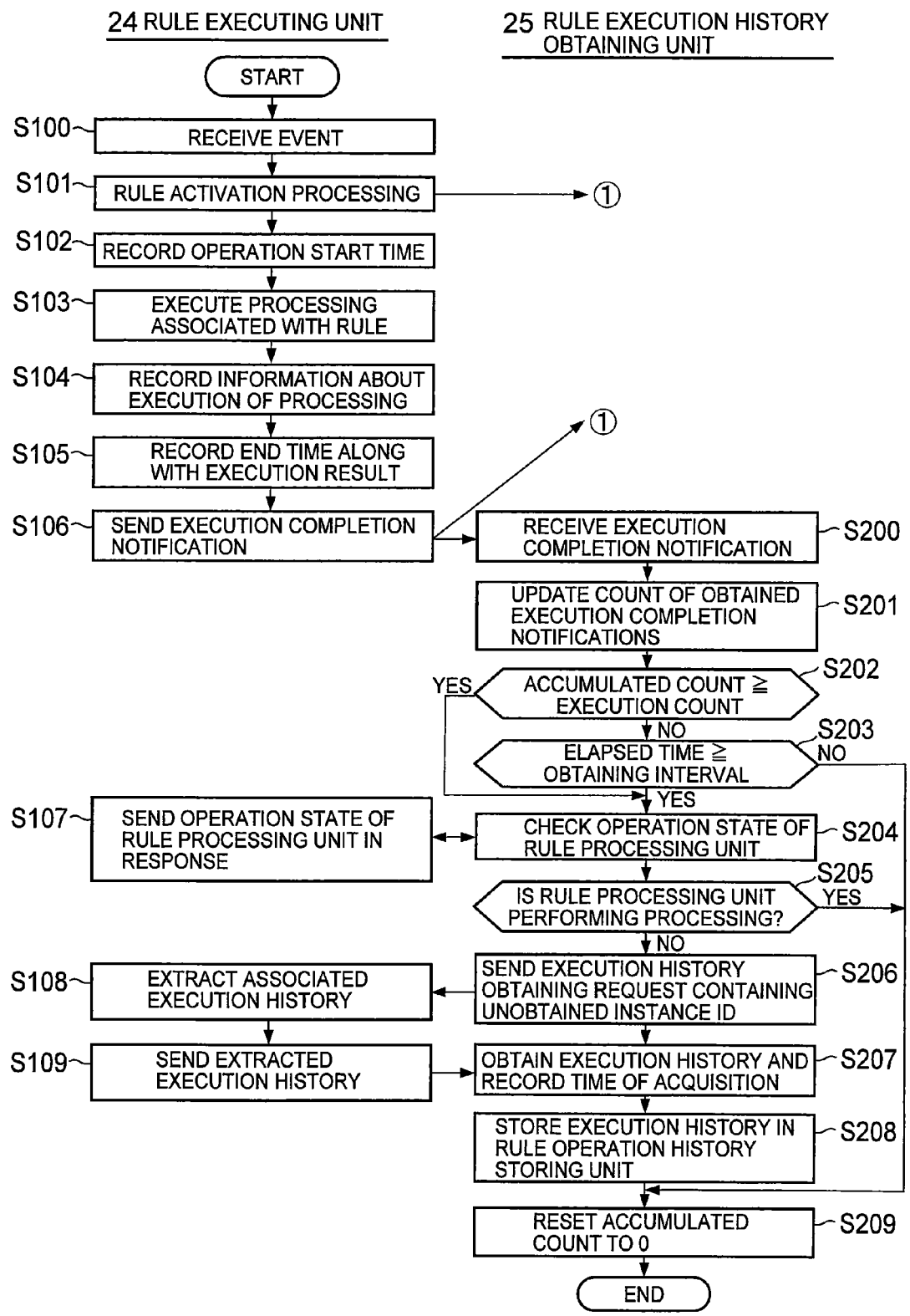
FIG. 4 is a flow chart showing an example of an operation of a performance evaluating apparatus for a rule.
Figure 5:
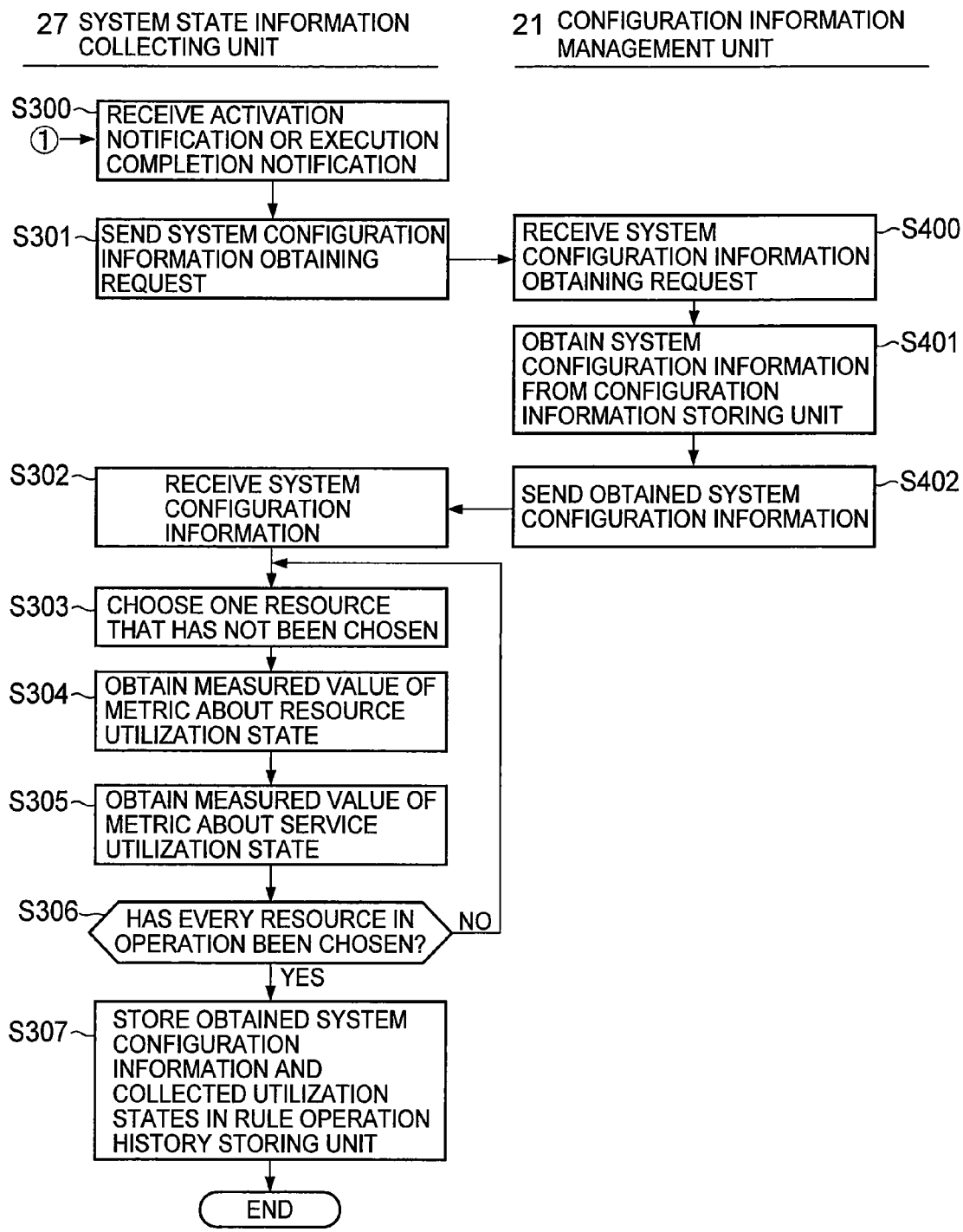
FIG. 5 is a flow chart showing an example of the operation of the performance evaluating apparatus for a rule.

FIGS. 4 and 5 are flow charts showing an example of the operation of the performance evaluating apparatus for a rule 2. The premise of the flow charts is that the configuration information storing unit 22 already stores configuration information of a business operation system created by a user and configuration information of an IT resource platform of an information system that hosts the business operation system while the rule definition information shown in FIG. 3 is already stored in the rule storing unit 240 by the user.

The performance evaluating apparatus for a rule 2 starts the operation shown in the flow chart of FIG. 4 in response to the reception of an event from one of the load balancers 13 or one of the computer resources 16, by the event receiving unit 23. An event sent from the load balancer 13 or the computer resource 16 in this embodiment matches an application condition contained in one of rules that are stored in the rule storing unit 240. In the example of this flow chart, the rule processing unit 241 obtains via the event receiving unit 23 an event notifying that the CPU utilization rate has dropped to 20% or lower in WebServer#1, which is one of the Web servers that hosts the Web tier logical component 30A.

First, the event receiving unit 23 notifies the rule processing unit 241 of the received event (S100). The rule processing unit 241 executes rule activation processing (S101). In Step S101, the rule processing unit 241 refers to the rule storing unit 240 to identify a rule that contains an application condition matching the received event, creates an instance that executes processing contained in the identified rule, and sends an activation notification containing identification information of the created instance to the system state information collecting unit 27.

Next, a time point at which the processing contained in the identified rule is activated is recorded in the execution history storing unit 242 in association with the identification information of the created instance (S102), and the created instance executes the associated processing (S103). For example, when the identified rule is one that has "A" as the RULE_ID 2400 in FIG. 3, the instance executes processing of "scaling-in the Web tier".

While the instance is executing the processing, an execution history about the processing is recorded in the execution history storing unit 242 (S104). After the instance finishes the processing, the rule processing unit 241 records, in the execution history storing unit 242, a result of executing the processing and the end time of the processing in association with the identification information of the instance (S105). The rule processing unit 241 then sends an execution completion notification containing identification information of the instance that has finished executing the processing, to the rule execution history obtaining unit 25 and the system state information collecting unit 27 (S106).

Through the processing of Steps S100 to S106, the rule executing unit 24 completes a series of processing related to activation of a rule, execution of processing contained in the rule, and completion of the execution of the processing.

Described next with reference to FIG. 5 is system state information collecting processing which is performed by the configuration information management unit 21 and the system state information collecting unit 27.

The system state information collecting unit 27 receives an activation notification or an execution completion notification from the rule processing unit 241 (S300), and sends an obtaining request to the configuration information management unit 21 as a request for the system configuration information of the business operation system (S301). Receiving the system configuration information obtaining request (S400), the configuration information management unit 21 obtains the requested system configuration information from the configuration information storing unit 22 (S401), and sends the obtained system configuration information to the system state information collecting unit 27 (S402).

The system configuration information sent to the system state information collecting unit 27 in Step S402 has, for example, a data configuration shown in FIG. 6. As shown in FIG. 6, the system configuration information contains, in association with a RESOURCE_ID 500, which is an identifier assigned to each resource, a TYPE 501, which indicates the type of the resource, a STATE 502, which indicates the operating state of the resource, a MACHINE_TYPE 503, which indicates the specification of the resource, and the like.

A type indicating a server role such as Web server, AP server, or DB server is stored as the TYPE 501. Information such as "RUNNING", which indicates that the resource is in operation, or "STANDBY", which indicates that the resource is an auxiliary resource or is on standby, is stored as the STATE 502. Stored as the MACHINE_TYPE 503 is a tag that indicates a classification by the machine specification of the computer resource such as the CPU type, the clock frequency of the CPU, the clock frequency of the front side bus (FSB) the memory size, the disk size, and the like.

Receiving the system configuration information from the configuration information management unit 21 (S302), the system state information collecting unit 27 refers to the received system configuration information to choose, as a resource for which information about the resource utilization state and information about the service utilization state are obtained, one among resources that are in operation and that have not been chosen (S303).

The system state information collecting unit 27 obtains a measured value of a metric related to the utilization state of the chosen resource (S304). The configuration of the data obtained by the system state information collecting unit 27 in Step S304 is, for example, as shown in FIG. 7. The resource utilization state information that is obtained by the system state information collecting unit 27 contains, for each RESOURCE_ID 510, which is an identifier assigned to each resource, CPU_UTIL 511, which indicates the CPU utilization rate of the resource in question, MEMORY_UTIL 512, which indicates the memory utilization rate of this resource, and the like.

The resource utilization state information obtained by the system state information collecting unit 27 may contain, in addition to the items shown in FIG. 7, the disk utilization rate, the network utilization rate, a resource shutdown time, the amount of power consumption, the amount of heat generated, and the like.

The system state information collecting unit 27 next obtains a measured value of a metric related to the service utilization state of the chosen resource (S305). The configuration of the data obtained by the system state information collecting unit 27 in Step S305 is, for example, as shown in FIG. 8. The information about the service utilization state that is obtained by the system state information collecting unit 27 contains, for each SERVICE_ID 520, which is an identifier assigned to each service, REQUESTS 521, which indicate the count of requests for the service in question, a RESPONSE_TIME 522, which indicates an average response time of the service, FAILS 523, which indicate how many requests for the service have failed to meet a service level agreement (SLA), THROUGHPUT 524, which indicates how many requests have been processed, and the like.

The service utilization state information obtained by the system state information collecting unit 27 may contain, in addition to the items shown in FIG. 8, a connection error count, a sales figure of transactions of a committed service, a service suspension time, and the like.

Next, the system state information collecting unit 27 refers to the system configuration information to judge whether or not every resource that is in operation has been chosen once (S306). In cases where there are resources that are in operation and have not been chosen (S306: No), the system state information collecting unit 27 repeats the processing of Step S303.

In cases where every resource that is in operation has been chosen once (S306: Yes), the system state information collecting unit 27 processes the information about the resource utilization state into a format as shown in FIG. 9 whereas the information about the service utilization state is processed into a format as shown in FIG. 10, and stores the processed information in the rule operation history storing unit 26 (S307). The system state information collecting unit 27 then ends the system state information collecting processing.

As shown in FIG. 9, the information about the resource utilization state contains, for each INSTANCE_ID 2600, a PERIOD 2601, a TYPE 2602, a MACHINE_TYPE 2603, a STATE 2604, NUMBER_OF 2605, CPU_UTIL 2606, and the like. Stored as the PERIOD 2601 is "START", which indicates that the collection of the system state information has been started due to an activation notification, or "END", which indicates that the collection of the system state information has been started due to an execution completion notification. The NUMBER_OF 2605 indicates the count of resources that have the same attributes in regard to the items from the TYPE 2602 to the STATE 2604. The CPU_UTIL 2606 indicates the average CPU utilization rate of resources that have the same attributes in regard to the items from the TYPE 2602 to the STATE 2604.

The system state information collecting processing shown in FIG. 5 is executed each time an activation notification or an execution completion notification is received from the rule processing unit 241. Accordingly, every piece of resource utilization state information that is collected in one round of system state information collecting processing has the same value as the INSTANCE_ID 2600 and has the same value as the PERIOD 2601.

As shown in FIG. 10, the information about the service utilization state contains, for each INSTANCE_ID 2610, a PERIOD 2611, a SERVICE_ID 2612, REQUESTS 2613, a RESPONSE_TIME 2614, FAIL S2615, THROUGHPUT 2616, and the like. Similarly to the information about the resource utilization state, every piece of service utilization state information that is collected in one round of system state information collecting processing has the same value as the INSTANCE_ID 2610 and has the same value as the PERIOD 2611.

Returning to FIG. 4, the description is continued.

The execution history acquisition executing unit 250 of the rule execution history obtaining unit 25 receives an execution completion notification from the rule processing unit 241 (S200), and increases the execution completion notification reception count by 1 (S201). The execution history acquisition executing unit 250 compares the accumulated reception count against an execution count entered in advance through the specified information receiving unit 251 by the user of the performance evaluating apparatus for a rule 2 (S202). When the accumulated reception count is equal to or larger than the execution count (S202: Yes), the execution history acquisition executing unit 250 executes processing of Step S204.

When the accumulated reception count is smaller than the execution count (S202: No), the execution history acquisition executing unit 250 judges whether or not a time having elapsed since a time point at which an execution history has been received from the execution history transmitting unit 243 last time is equal to or longer than an obtaining interval entered in advance through the specified information receiving unit 251 (S203). In cases where the elapsed time is less than the obtaining interval (S203: No), the performance evaluating apparatus for a rule 2 ends the processing shown in the flow chart of FIG. 4.

In cases where the elapsed time is equal to or longer than the obtaining interval (S203: Yes), the execution history acquisition executing unit 250 inquires of the execution history transmitting unit 243 about the operation state of the rule processing unit 241 (S204). The execution history transmitting unit 243 sends the operation state of the rule processing unit 241 to the execution history acquisition executing unit 250 in response to the inquiry (S107). The execution history acquisition executing unit 250 then judges whether or not the rule processing unit 241 is performing processing (S205). In cases where the rule processing unit 241 is performing processing (S205: Yes), the performance evaluating apparatus for a rule 2 ends the processing shown in this flow chart.

In cases where the rule processing unit 241 is not performing processing (S205: No), the execution history acquisition executing unit 250 searches the rule operation history storing unit 26 for instance identification information that is contained in the resource utilization state information described with reference to FIG. 9, or the service utilization information described with reference to FIG. 10, and for which no execution history has been stored in the rule operation history storing unit 26. The execution history acquisition executing unit 250 sends an execution history obtaining request that contains the retrieved instance identification information, to the execution history transmitting unit 243 (S206).

Receiving the execution history obtaining request, the execution history transmitting unit 243 extracts, from the execution history storing unit 242, an execution history that is associated with the instance identification information contained in the received execution history obtaining request (S108). The execution history transmitting unit 243 sends the extracted execution history to the execution history acquisition executing unit 250 (S109).

The execution history acquisition executing unit 250 receives the execution history from the execution history transmitting unit 243 and saves the time of reception (S207). The execution history acquisition executing unit 250 then stores the received execution history in the rule operation history storing unit 26 (S208). The execution history stored in Step S208 by the execution history acquisition executing unit 250 in the rule operation history storing unit 26 has, for example, a configuration shown in FIG. 11.

As shown in FIG. 11, the execution history contains, for each RULE_ID 2620, an INSTANCE_ID 2621, a START_TIME 2622, which indicates the time of activation of processing that is contained in a rule identified by the RULE_ID 2620, an END_TIME 2623, which indicates the time of completion of the execution of the processing that is contained in the rule identified by the RULE_ID 2620, an EXECUTED_ACTION_ID 2624, which indicates the processing that is contained in the rule identified by the RULE_ID 2620, a RESULT 2625, which indicates a result of executing the processing, and the like.

Through the steps shown in FIGS. 4 and 5, in cases of executing the processing that is associated with an event sent from a business operation system, system state information prior to the execution of the processing that is associated with an event sent from a business operation system and system state information after the execution of this processing are collected, an execution history of this processing is collected, and the collected system state information and execution history are stored in the rule operation history storing unit 26 in association with instance identification information.

The amount of data to be collected can be reduced by thus collecting data only immediately before and after execution of processing that is associated with an event instead of constantly collecting information that indicates the state of a monitored system. In addition, collecting system state information immediately before and after execution of the processing enables the evaluating apparatus to evaluate effects of the respective rules based on the collected information.

Described next with reference to FIG. 12 is processing that is performed by the performance evaluating apparatus for a rule 2 to output a rule operation history upon request from a user. The premise of FIG. 12 is that the processing described with reference to FIGS. 4 and 5 has been executed and that the rule operation history storing unit 26 has accumulated data.

First, the effect calculating unit 28 receives a rule operation history information display request from the user of the performance evaluating apparatus for a rule 2 through the input/output unit 20 (S500). In Step S500, the effect calculating unit 28 receives from the user a target period, an item of system state information to be referred to, an output format, and the like.

Next, the effect calculating unit 28 analyzes the received display request to extract necessary data from the rule operation history storing unit 26 (S501). The effect calculating unit 28 obtains a calculation formula used in processing the data into a format that is requested by the user, and processes the extracted data with the use of the obtained calculation formula (S502). The effect calculating unit 28 stores, in advance, as shown in FIG. 13, for example, a DEFINITION 531, which indicates a calculation formula defined by the user, in association with a DEF_ID 530, which is an identifier assigned to each calculation formula.

With a calculation formula that has "E1" as the DEF_ID 530, the resource utilization state information shown in FIG. 9 is searched for pieces of data that share the same INSTANCE_ID 2600, TYPE 2602, MACHINE_TYPE 2603, and STATE 2604. From these pieces of data, one that has "END" as the PERIOD 2601 and one that has "START" as the PERIOD 2601 are picked out, and the NUMBER_OF 2605 of the latter data is subtracted from the NUMBER_OF 2605 of the former data. The thus obtained value is multiplied by a FINANCIAL_COST 541 of a corresponding MACHINE_TYPE 540 of FIG. 14. The cost of increasing or reducing resources can be calculated in this manner for each executed processing of a rule.

With a calculation formula that has "E2" as the DEF_ID 530, the resource utilization state information shown in FIG. 9 is searched for pieces of data that share the same INSTANCE_ID 2600 and that have "END" as the PERIOD 2601, as well as pieces of data that share the same INSTANCE_ID 2600 and that have "START" as the PERIOD 2601. The arithmetic average of the CPU_UTIL 2606 of the latter pieces of data is subtracted from the arithmetic average of the CPU_UTIL 2606 of the former pieces of data. The effective resource utilization degree can thus be calculated for each executed processing of a rule.

With a calculation formula that has "E3" as the DEF_ID 530, the resource utilization state information shown in FIG. 9 and information stored in advance in the effect calculating unit 28 such as the information shown in FIG. 14 which indicate the resource cost and the amount of power consumption, are searched for pieces of data that share the same INSTANCE_ID 2600, TYPE 2602, MACHINE_TYPE 2603, and STATE 2604. From these pieces of data, one that has "END" as the PERIOD 2601 and one that has "START" as the PERIOD 2601 are picked out to find resources for which the CPU_UTIL 2606 of the former data and the CPU_UTIL 2606 of the latter data are both in a FULL_POWER state (a state in which the average CPU utilization rate is 50% or higher in FIG. 14). An increase or decrease in number of such resources is then calculated.

In the same manner, with a calculation formula that has "E3" as the DEF_ID 530, the resource utilization state information shown in FIG. 9 and information stored in advance in the effect calculating unit 28, such as the information shown in FIG. 14, which indicate the resource cost and the amount of power consumption, are searched for pieces of data that share the same INSTANCE_ID 2600, TYPE 2602, MACHINE_TYPE 2603, and STATE 2604. From these pieces of data, one that has "START" as the PERIOD 2601 and one that has "END" as the PERIOD 2601 are picked out to find resources for which the CPU_UTIL 2606 of the former data and the CPU_UTIL 2606 of the latter data are both in a SAVED_POWER state (a state in which the average CPU utilization rate is lower than 50% in FIG. 14). An increase or decrease in number of such resources is then calculated.

The calculated increase/decrease in number of resources that are in a FULL_POWER state is multiplied by a power consumption amount of the FULL_POWER state (300 W in FIG. 14 in cases where the MACHINE_TYPE 540 is "SERVER_00"). The calculated increase/decrease in number of resources that are in a SAVED_POWER state is multiplied by a power consumption amount of the SAVED_POWER state (200 W in FIG. 14 in cases where the MACHINE_TYPE 540 is "SERVER_00"). The products are added and an increase or decrease in amount of power consumption can thus be calculated for each executed processing of a rule.

With a calculation formula that has "E4" as the DEF_ID 530, the service utilization state information shown in FIG. 10 and information stored in advance in the effect calculating unit 28 such as the information shown in FIG. 15, which is a digitized business value of a service, are searched for pieces of data that share the same INSTANCE_ID 2610, PERIOD 2611, and SERVICE_ID 2612. The values of the THROUGHPUT 2616 of these pieces of data are multiplied by the values of a SERVICE_VALUE 551, and the products are summed up for each rule. For instance, in cases where the SERVICE_ID 2612 is "CATALOG", the SERVICE_VALUE 551 is "100/tran" in FIG. 15. A sales contribution degree can thus be obtained for each executed processing of a rule.

With a calculation formula that has "E4" as the DEF_ID 530, the service utilization state information shown in FIG. 10 and information stored in advance in the effect calculating unit 28 such as the information shown in FIG. 15, which is a digitized business value of a service, are searched for pieces of data that share the same INSTANCE_ID 2610, PERIOD 2611, and SERVICE_ID 2612. The values of the FAILS 2615 of these pieces of data are multiplied by the values of a FAILS_LOST 552, and the products are summed up for each rule. For instance, in cases where the SERVICE_ID 2612 is "CATALOG", the FAILS_LOST 552 is "0.2" in FIG. 15. A lost chance degree can thus be obtained for each executed processing of a rule.

In the above-mentioned data processing, the effect calculating unit 28 processes data with the use of a calculation formula that is stored in advance in the effect calculating unit 28. Alternatively, the effect calculating unit 28 may use a calculation formula that is entered by a user through the input/output unit 20 in processing data.

The effect calculating unit 28 outputs the processed data as, for example, screen data that has a configuration shown in FIG. 16 (S503), and then ends the processing shown in this flowchart. The effect calculating unit 28 may output data on a rule basis, or per executed processing of a rule. Also, the effect calculating unit 28 may calculate the business value of a rule by a preset calculation formula from an execution history of processing prescribed by the rule and from system state information on a processing basis of a service provided by a computer system in which the processing prescribed by the rule is executed.

In the example of FIG. 16, the effect calculating unit 28 executes statistical processing about processed data per processing for each rule. As a result, an activation count 561, a success count 562, which indicates how many times an objective has been accomplished, an average execution time 563, a resource utilization state 564, a service utilization state 565, and a business value 566 within a specified period are displayed for each RULE_ID 560 by the effect calculating unit 28.

The resource utilization state 564 contains a resource increase/decrease in number, an average CPU utilization rate, a power consumption increase/decrease in amount, and the like. The service utilization state 565 contains an average processing rate, a processing amount, and a rate of accomplishing a service level objective (SLO) such as "response time: within five seconds". The business value 566 contains numerical values indicating business values that are calculated by the effect calculating unit 28, for example, the resource cost, the effective resource utilization degree, the sales contribution degree, the lost chance degree, and the like. By referring to information as shown in FIG. 16, a user can evaluate each rule for its business values including the sales figure, the lost chance amount, the cost reduction amount, the effective resource utilization degree, the environment burdening degree, and the like.

Figure 17:
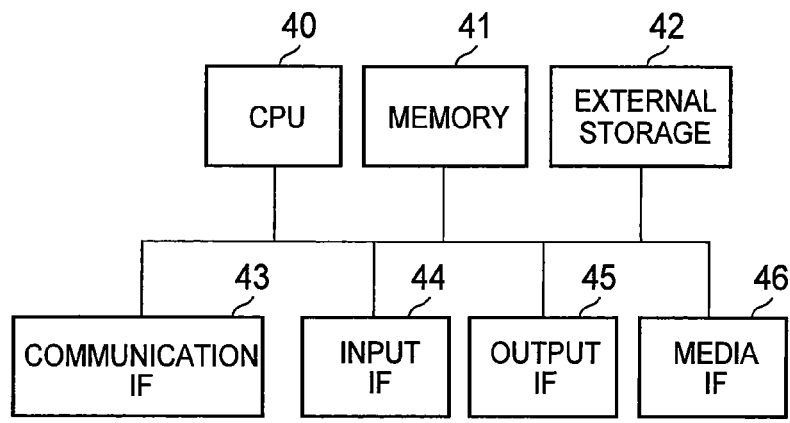
FIG. 17 is a diagram showing an example of a hardware configuration for realizing functions of the performance evaluating apparatus for a rule.

FIG. 17 is a diagram showing an example of a hardware configuration for implementing functions of the performance evaluating apparatus for a rule 2. The performance evaluating apparatus for a rule 2 in this embodiment has a central processing unit (CPU) 40, a memory 41 such as a random access memory (RAM) or a read-only memory (ROM), an external storage 42 such as a hard disk drive (HDD), a communication interface (IF) 43, an input interface (IF) 44, an output interface (IF) 45, and a media interface (IF) 46.

The CPU 40 operates in accordance with a program stored in the memory 41 or in the external storage 42 to control the components of the performance evaluating apparatus for a rule 2. The memory 41 stores a boot program, which is executed by the CPU 40 in activating the performance evaluating apparatus for a rule 2, an application program, a program dependent on hardware of the performance evaluating apparatus for a rule 2, data used by the CPU 40, and the like.

The communication IF 43 provides the CPU 40 with data received via the management network 15 from the load balancers 13, the computer resources 16, or others. The communication IF 43 also sends data created by the CPU 40 to the load balancers 13, the computer resources 16, or others via the management network 15.

The CPU 40 controls an input device such as a keyboard or a mouse through the input IF 44, and obtains data from the input device through the input IF 44. The CPU 40 controls an output device such as a liquid crystal display (LCD) through the output IF 45, and outputs created data to the output device through the output IF 45.

The media IF 46 reads a program or data stored in a recording medium and provides the read program or data to the CPU 40, the memory 41, and the communication IF 43. A program provided to the CPU 40 through the memory 41 is stored in this recording medium. The program is read out of the recording medium by the media IF 46, is installed in the performance evaluating apparatus for a rule 2 through the memory 41, and is executed by the CPU 40.

The external storage 42 stores data that is stored in the configuration information storing unit 22, the rule storing unit 240, the execution history storing unit 242, and the rule operation history storing unit 26. A program installed and executed in the performance evaluating apparatus for a rule 2 causes the performance evaluating apparatus for a rule 2 to function as the input/output unit 20, the configuration information management unit 21, the configuration information storing unit 22, the event receiving unit 23, the rule executing unit 24, the rule execution history obtaining unit 25, the rule operation history storing unit 26, the system state information collecting unit 27, the effect calculating unit 28, and the network IF unit 29.

The performance evaluating apparatus for a rule 2 reads these programs out of a recording medium through the media IF 46 for execution. Alternatively, the performance evaluating apparatus for a rule 2 may obtain these programs from another device via a communication network. A recording medium read by the media IF 46 is, for example, an optical recording medium such as a DVD or a PD, a magneto-optical recording medium such as an MO, a tape medium, a magnetic recording medium, or a semiconductor memory.

An embodiment of the present invention has thus been described.

As is clear from the above-mentioned description, the performance evaluating apparatus for a rule 2 according to the present invention can efficiently collect information for evaluating from the business viewpoint a rule that is used in the operation and management of an information system through autonomous control, by focusing on and collecting the information immediately before and after the rule is executed.

The present invention is not limited to the embodiment described above, but can be modified in various ways within the gist of the invention.

Figure 18:
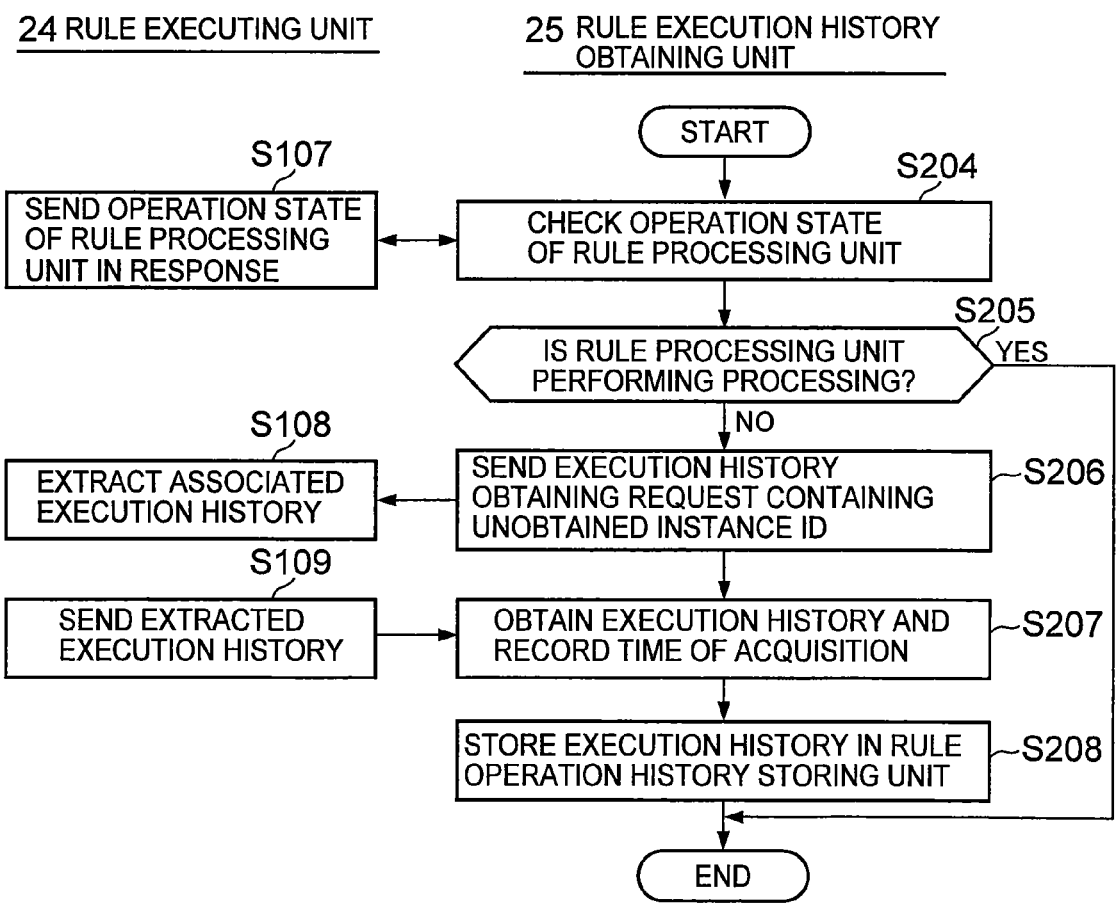
FIG. 18 is a flow chart showing another example of execution history collection processing which is executed by the performance evaluating apparatus for a rule.

For instance, while the rule execution history obtaining unit 25 in the flow chart of FIG. 4 does not make an attempt to obtain an execution history in the execution history storing unit 242 until the rule processing unit 241 finishes executing processing that is contained in a rule, the rule execution history obtaining unit 242 may attempt to obtain an execution history in the execution history storing unit 242 regularly or when a preset condition is met, irrespective of whether the rule processing unit 241 has finished executing the processing as shown in FIG. 18. Alternatively, the processing shown in the flow chart of FIG. 18 may be executed in addition to the processing shown in the flow chart of FIG. 4.

The performance evaluating apparatus for a rule 2 in the above embodiment has the configuration information storing unit 22, the rule storing unit 240, the execution history storing unit 242, and the rule operation history storing unit 26. In another embodiment, data stored in these storing units may be stored in an external storage so that the performance evaluating apparatus for a rule 2 obtains data in the external storage or write data in the external storage by communicating with the external storage over a network.

In the above embodiment, the performance evaluating apparatus for a rule 2 which is a single machine implements the input/output unit 20, the configuration information management unit 21, the configuration information storing unit 22, the event receiving unit 23, the rule executing unit 24, the rule execution history obtaining unit 25, the rule operation history storing unit 26, the system state information collecting unit 27, the effect calculating unit 28, and the network IF unit 29. In another embodiment, each of these functions may be implemented by one of multiple computers, and the multiple computers communicate with one another, whereby all of the multiple computers function as the performance evaluating apparatus for a rule 2.

What is claimed is:

1. A performance evaluating apparatus for an information system having multiple computers, the apparatus comprising:

a rule executing unit adapted to send an execution start notification including identification information of a processing prescribed by a rule in the information system before executing the processing prescribed by the rule, the rule executing unit further adapted to execute the processing prescribed by the rule in the information system, and to send an execution completion notification including identification information of the processing prescribed by the rule after the processing prescribed by the rule has been executed;

a rule operation history storing unit adapted to store an execution history in association with at least two items of system state information in response to receiving both the execution start notification and the execution completion notification from the rule executing unit before and after processing prescribed by the rule is executed by the rule executing unit in the information system respectively, the execution history being a log of execution of the processing prescribed by the rule in the information system, the system state information including configuration information about a configuration of the information system, operation information that indicates an operating state of computer resources constituting the information system, and utilization information that indicates a utilization state of a service provided by the information system;

a system state information collecting unit adapted to collect system start state information in response to receiving the execution start notification sent from the rule executing unit and to collect system end state information in response to receiving the execution completion notification sent from the rule executing unit, the system state collecting unit further adapted to store the collected system start state information in the rule operation history storing unit, in association with identification information of the processing prescribed by the rule and a start symbol, and to store the collected system end state information in the rule operation history storing unit, in association with the same identification information of the processing prescribed by the rule and an end symbol; and an effect calculating unit which uses a preset calculation formula to calculate a business value of the rule based on the execution history, the stored system start state information, and the stored system end state information.

2. A performance evaluating apparatus according to claim 1, wherein the effect calculating unit has a calculation formula input receiving unit which receives the calculation formula as input from outside of the apparatus.

3. A performance evaluating apparatus according to claim 1, wherein the calculation formula is for calculating business value including at least one of the following items (1) through (5):

(1) a resource increase/decrease cost obtained by classifying computer resources that constitute a monitored information system by machine type, counting the number of computer resources for each machine type using the stored system start state information and the stored system end state information, multiplying a difference between pre-execution resource count and a post-execution resource count by a financial cost for each given machine type, and summing up products for each machine type of the computer resources that constitute the monitored information system;

(2) an effective resource utilization degree obtained by checking which ones of the computer resources that constitute the monitored information system are in operation, obtaining an average resource utilization rate of the computer resources that are in operation using the stored system start state information and the stored system end state information, the resource utilization rate including at least one of a CPU utilization rate, a memory utilization rate, a disk utilization rate, and a network utilization rate, and calculating a difference between an average resource utilization rate of pre-execution resource utilization rates and an average resource utilization rate of post-execution resource utilization rates;

(3) an amount of power consumption obtained by classifying computer resources that constitute the monitored information system by power consumption amount, counting a number of computer resources that are classified as having the same power consumption amount using the stored system start state information and the stored system end state information, multiplying a difference between the pre-execution resource count and the post-execution resource count by the power consumption amount used in the classification with respect to each classification, and summing up products for computer resources constituting the information system;

(4) a sales contribution degree obtained by counting how many requests are processed in a service that is provided by the monitored information system using the stored system start state information and the stored system end state information, multiplying a difference between the pre-execution request count and the post-execution request count by a service value for each processing that is defined for each respective service, and summing products for every service provided by the monitored information system; and (5) a lost chance degree obtained by counting how many requests for a service that is provided by the monitored information system end up as an error using the stored system start state information stored and the stored system end state information, multiplying a difference between a pre-execution error count and a post-execution error count by a weighting coefficient for one of an increase and a decrease in number of lost chances corresponding to each error count defined for each respective service, and summing up products for every service provided by the monitored information system.

4. A performance evaluating apparatus according to claim 1, wherein the effect calculating unit uses a preset calculation formula to calculate from the execution history, the stored system start state information, and the stored system end state information, a business value of the rule per processing unit of a service provided by a computer system in which the processing prescribed by the rule has been executed.

5. A performance evaluating apparatus according to claim 1, wherein the rule executing unit stores, as a rule execution history, an execution history processing prescribed by the rule; and wherein the apparatus further comprises a rule execution history obtaining unit which obtains, under a given condition, the rule execution history stored in the rule executing unit.

6. A performance evaluating apparatus according to claim 5, wherein the rule execution history obtaining unit comprises a specified information receiving unit which receives, as input, a condition for obtaining a rule execution history that is stored in the rule executing unit.

7. A performance evaluating apparatus according to claim 5, wherein processing in the execution history obtaining unit is processed independently of processing in the rule executing unit and processing in the system state information collecting unit.

8. A performance evaluating method for a performance evaluating apparatus of an information system having multiple computers, the performance evaluating apparatus including a rule executing unit, a rule operation history storing unit, an effect calculating unit, a rule execution history obtaining unit and a system state information collecting unit, the method comprising:

executing, by the rule executing unit, processing prescribed in a rule in accordance with a state of a monitored system;

storing, by the rule executing unit, as a rule execution history, a history about execution of processing prescribed by the rule;

recording, by the rule operation history storing unit, a rule execution history in association with system state information obtained before and after execution of processing prescribed by the rule, the system state information including:

configuration information about a configuration of the monitored information system, operation information that indicates an operating state of computer resources constituting the monitored information system, and utilization information that indicates a utilization state of a service provided by the monitored information system;

sending, before executing the processing prescribed by the rule, an execution start notification including identification information of the processing prescribed by the rule, to the system state information collecting unit;

sending, after the execution of the processing prescribed by the rule is finished, an execution completion notification including identification information of a processing prescribed by the rule, to the system state information collecting unit, wherein the system state information collecting unit performs the operations of:

receiving one of the execution start notification and the execution completion notification sent from the rule executing unit;

collecting system start state information in response to receiving the execution start notification and collecting system end state information after receiving the execution completion notification; and storing the collected system state information in the rule operation history storing unit, in association with identification information of the processing prescribed by the rule and a start/end symbol which indicates whether the system state information has been collected at the start of the execution of the processing prescribed by the rule or at the completion of the execution of the processing prescribed by the rule, calculating, by the effect calculating unit, using a preset calculation formula, a business value of the rule based on the execution history, the stored system start state information and the stored system end state information.

9. A performance evaluating method according to claim 8, wherein the effect calculating unit executes the step of receiving the calculation formula as an input from outside.

10. A performance evaluating method according to claim 8, wherein the calculation formula is for calculating business value including at least one of the following items (1) through (5):

(1) a resource increase/decrease cost obtained by classifying computer resources that constitute the monitored information system by machine type, counting the number of the computer resources for each machine type using the stored system start state information and the stored system end state information, multiplying a difference between a pre-execution resource count and a post-execution resource count by a financial cost for each given machine type, and summing up the product for each machine type of the computer resources that constitute the monitored information system;

(2) an effective resource utilization degree obtained by checking which ones of the computer resources that constitute the monitored information system are in operation, obtaining an average resource utilization rate of the computer resources that are in operation using the stored system start state information and the stored system end state information, the resource utilization rate including at least one of a CPU utilization rate, a memory utilization rate, a disk utilization rate, and a network utilization rate, and calculating a difference between average resource utilization rate of pre-execution resource utilization rates and an average resource utilization rate of post-execution resource utilization rates;

(3) an amount of power consumption obtained by classifying computer resources that constitute the monitored information system by the power consumption amount, counting the number of computer resources that are classified as having the same power consumption amount using the stored system start state information and the stored system end state information, multiplying a difference between the pre-execution resource count and the post-execution resource count by the power consumption amount used in each respective classification, and summing up products for the computer resources that constitute the information system;

(4) a sales contribution degree obtained by counting how many requests are processed in a service that is provided by the monitored information system using the stored system start state information and the stored system end state information, multiplying a difference between the pre-execution request count and the post-execution request count by a service value for each processing that is defined for each respective service, and summing up products for every service provided by the monitored information system; and (5) a lost chance degree obtained by counting how many requests for a service provided by the monitored information system resulted in an error using the stored system start state information and the stored system end state information, multiplying a difference between a pre-execution error count and a post-execution error count by a weighting coefficient for one of an increase and a decrease in number of lost chance which is specific to each error count defined for each respective service, and summing up products for every service provided by the monitored information system.

11. A performance evaluating method according to claim 8, wherein the effect calculating unit uses a preset calculation formula to calculate from the execution history, the stored system start state information and the stored system end state information, a business value of the rule per processing unit of a service provided by a computer system in which the processing prescribed by the rule has been executed.

12. A performance evaluating method according to claim 8, wherein the rule execution history obtaining unit executes a step of obtaining, under a given condition, the rule execution history stored in the rule executing unit.

13. A performance evaluating method according to claim 12, wherein the rule execution history obtaining unit further executes a step of receiving, as input, a condition for obtaining the rule execution history that is stored in the rule executing unit.

14. A performance evaluating method according to claim 12, wherein the step of obtaining the rule execution history is executed independently of the execution of the steps performed by the rule executing unit and execution of the steps performed by the system state information collecting unit.

15. A non-transitory computer-readable medium having stored thereon software instructions that, when executed by a performance evaluating system of an information system having multiple computers, cause the performance evaluating system to perform functions comprising:

executing processing prescribed in an associated rule in accordance with a state of a monitored system;

storing a rule execution history including a history about execution of processing prescribed by the rule;

sending, before executing the processing prescribed by the rule, an execution start notification including identification information of the processing prescribed by the rule to the system state information collecting function;

sending, after the execution of the processing prescribed by the rule is finished, an execution completion notification including identification information of a processing prescribed by the rule to the system state information collecting function,
collecting system start state information in response to receiving the execution start notification and collecting system end state information in response to receiving the execution completion notification;
storing the collected system state information in association with identification information of the processing prescribed by the rule and a start/end symbol which indicates whether the system state information has been collected at the start of the execution of the processing prescribed by the rule or at the completion of the execution of the processing prescribed by the rule; and
calculating an effect using a preset calculation formula to calculate a business value of the rule based on the execution history, the stored system start state information and the stored system end state information,
wherein storing the rule execution history includes storing an execution history of the rule in association with system state information obtained before and after execution of processing prescribed by the rule in the information system, the system state information including configuration information about a configuration of a monitored information system, operation information that indicates an operating state of computer resources constituting the monitored information system, and utilization information that indicates a utilization state of a service provided by the monitored information system.

16. A computer-readable medium according to claim 15, wherein the effect calculating function has a calculation formula input receiving function which receives the calculation formula as an input from outside the performance evaluating unit.

17. A computer-readable medium according to claim 15, wherein the calculation formula is for calculating business value including at least one of the following items (1) through (5):
   (1) a resource increase/decrease cost obtained by classifying computer resources that constitute the monitored information system by machine type, counting the number of computer resources for each machine type using the stored system start state information and the stored system end state information, multiplying a difference between a pre-execution resource count and a post-execution resource count by a financial cost for each machine type, and summing up the products for each machine type constituting the monitored information system;
   (2) an effective resource utilization degree obtained by checking which ones of the computer resources that constitute the monitored information system are in operation, obtaining an average resource utilization rate of the computer resources that are in operation using the stored system start state information and the stored system end state information respectively, the resource utilization rate including at least one of a CPU utilization rate, a memory utilization rate, a disk utilization rate, and a network utilization rate, and calculating a difference between an average pre-execution resource utilization rate and an average resource post-execution utilization rate;
   (3) an amount of power consumption obtained by classifying computer resources constituting the monitored information system by the power consumption amount, counting the number of computer resources that are classified as having the same power consumption amount using the stored system start state information and the stored system end state information, multiplying a difference between a pre-execution resource count and a post-execution resource count by the power consumption amount used in the classification with respect to each classification, and summing up the products for the computer resources constituting the information system;
   (4) a sales contribution degree obtained by counting how many requests are processed in a service that is provided by the monitored information system using the stored system start state information and the stored system end state information, multiplying a difference between a pre-execution request count and a post-execution request count by a service value for each processing that is defined for each respective service, and summing up products for every service provided by the monitored information system; and
   (5) a lost chance degree obtained by counting how many requests for a service provided by the monitored information system result in an error using the stored system start state information and the stored system end state information, multiplying a difference between a pre-execution error count and a post-execution error count by a weighting coefficient for one of an increase and a decrease in number of lost chance specific to each error count defined for each respective service, and summing up the products for every service provided by the monitored information system.

18. A computer-readable medium according to claim 15, wherein the effect calculating function further includes a function which uses a preset calculation formula to calculate from the execution history, the system start state information and the system end state information, a business value of the rule per processing unit of a service provided by a computer system in which the processing prescribed by the rule has been executed.

19. A computer-readable medium according to claims 15, further comprising obtaining, under a given condition, the stored rule execution history.

20. A computer-readable medium according to claim 19, further comprising receiving as input a condition for obtaining the stored rule execution history.

21. A computer-readable medium according to claim 19, wherein obtaining the rule execution history is executed independently of the rule execution and the system state information collecting.

* * * * *